United States Patent
Kashihara (10) Patent No.: US 11,677,309 B2
(45) Date of Patent: Jun. 13, 2023

(54) INVERTER DEVICE

(71) Applicant: SANDEN HOLDINGS CORPORATION, Isesaki (JP)

(72) Inventor: Tatsuki Kashihara, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 84 days.

(21) Appl. No.: 17/615,771

(22) PCT Filed: Jul. 21, 2020

(86) PCT No.: PCT/JP2020/028255
§ 371 (c)(1),
(2) Date: Dec. 1, 2021

(87) PCT Pub. No.: WO2021/020231
PCT Pub. Date: Feb. 4, 2021

(65) Prior Publication Data
US 2022/0320995 A1 Oct. 6, 2022

(30) Foreign Application Priority Data
Jul. 31, 2019 (JP) .............................. JP2019-140701

(51) Int. Cl.
*H02M 1/12* (2006.01)
*H02M 1/084* (2006.01)
(Continued)

(52) U.S. Cl.
CPC ........... *H02M 1/123* (2021.05); *H02M 1/084* (2013.01); *H02M 7/53871* (2013.01); *H02P 21/14* (2013.01); *H02P 27/08* (2013.01)

(58) Field of Classification Search
CPC .. H02M 1/123; H02M 1/084; H02M 7/53871; H02P 21/14; H02P 27/08
See application file for complete search history.

(56) References Cited

U.S. PATENT DOCUMENTS 9,819,299 B2 * 11/2017 Ajima ..................... B60L 50/51
11,223,296 B2 * 1/2022 Kashihara ............... H02M 1/32
(Continued)

FOREIGN PATENT DOCUMENTS

JP 10-023760 A 1/1998
JP 2003-018853 A 1/2003
(Continued)

OTHER PUBLICATIONS

Japan Patent Office, International Search Report issued in International Application No. PCT/JP2020/028255, dated Sep. 1, 2020.

*Primary Examiner* — Adolf D Berhane
(74) *Attorney, Agent, or Firm* — Baker Botts L.L.P.

(57) ABSTRACT

An inverter device is provided which is capable of effectively eliminating or suppressing common mode noise in consideration of the influence of a dead time by using the function of a PWM signal generating unit. A control device 21 includes a phase voltage command calculating unit 33 which calculates three-phase modulation voltage command values for generating voltages to be applied to respective phases of a motor 8, and a PWM signal generating unit 36 which, based on the three-phase modulation voltage command values and a single carrier signal, generates a PWM signal to PWM-control an inverter circuit 28. The PWM signal generating unit 36 corrects the three-phase modulation voltage command values output by the phase voltage command calculating unit 33 to thereby cancel a change in the phase voltage applied to the motor 8 by a change in another phase voltage.

16 Claims, 8 Drawing Sheets (51) Int. Cl.
*H02M 7/5387* (2007.01)
*H02P 21/14* (2016.01)
*H02P 27/08* (2006.01)

(56) References Cited

U.S. PATENT DOCUMENTS

| | | | | |
|---|---|---|---|---|
| 11,283,386 | B2* | 3/2022 | Kashihara | H02M 7/53873 |
| 2012/0001581 | A1* | 1/2012 | Sumita | H02P 21/0003 |
| | | | | 318/490 |
| 2013/0039100 | A1* | 2/2013 | Kazama | H02M 7/497 |
| | | | | 363/41 |
| 2019/0131887 | A1* | 5/2019 | Mori | H02M 1/08 |
| 2019/0252970 | A1* | 8/2019 | Ohdaira | H02P 27/08 |
| 2021/0367545 | A1* | 11/2021 | Ogami | H02P 27/085 |
| 2023/0035063 | A1* | 2/2023 | Hara | H02M 7/5387 |
| 2023/0101356 | A1* | 3/2023 | Araki | H02P 21/22 |
| | | | | 318/400.23 |

FOREIGN PATENT DOCUMENTS

| | | | |
|---|---|---|---|
| JP | 4389446 | B2 | 12/2009 |
| JP | 2012-205370 | A | 10/2012 |
| JP | 5045137 | B2 | 10/2012 |
| JP | 2016-010278 | A | 1/2016 |

* cited by examiner

INVERTER DEVICE

CROSS-REFERENCE TO RELATED APPLICATIONS

This application is a U.S. National Stage Patent Application under 37 U.S.C. § 371 of International Patent Application No. PCT/JP2020/028255, filed on Jul. 21, 2020, which claims the benefit of Japanese Patent Application No. JP 2019-140701, filed on Jul. 31, 2019, the disclosures of each of which are incorporated herein by reference in their entirety.

TECHNICAL FIELD

The present invention relates to an inverter device which applies an AC voltage to a motor by an inverter circuit to drive the motor.

BACKGROUND ART

Conventionally, an inverter device for driving a motor includes a three-phase inverter circuit constituted of a plurality of switching elements, and PWM (Pulse Width Modulation)-controls the switching elements of each phase of UVW and applies a voltage waveform close to a sine wave to the motor to drive it.

Figure 7:
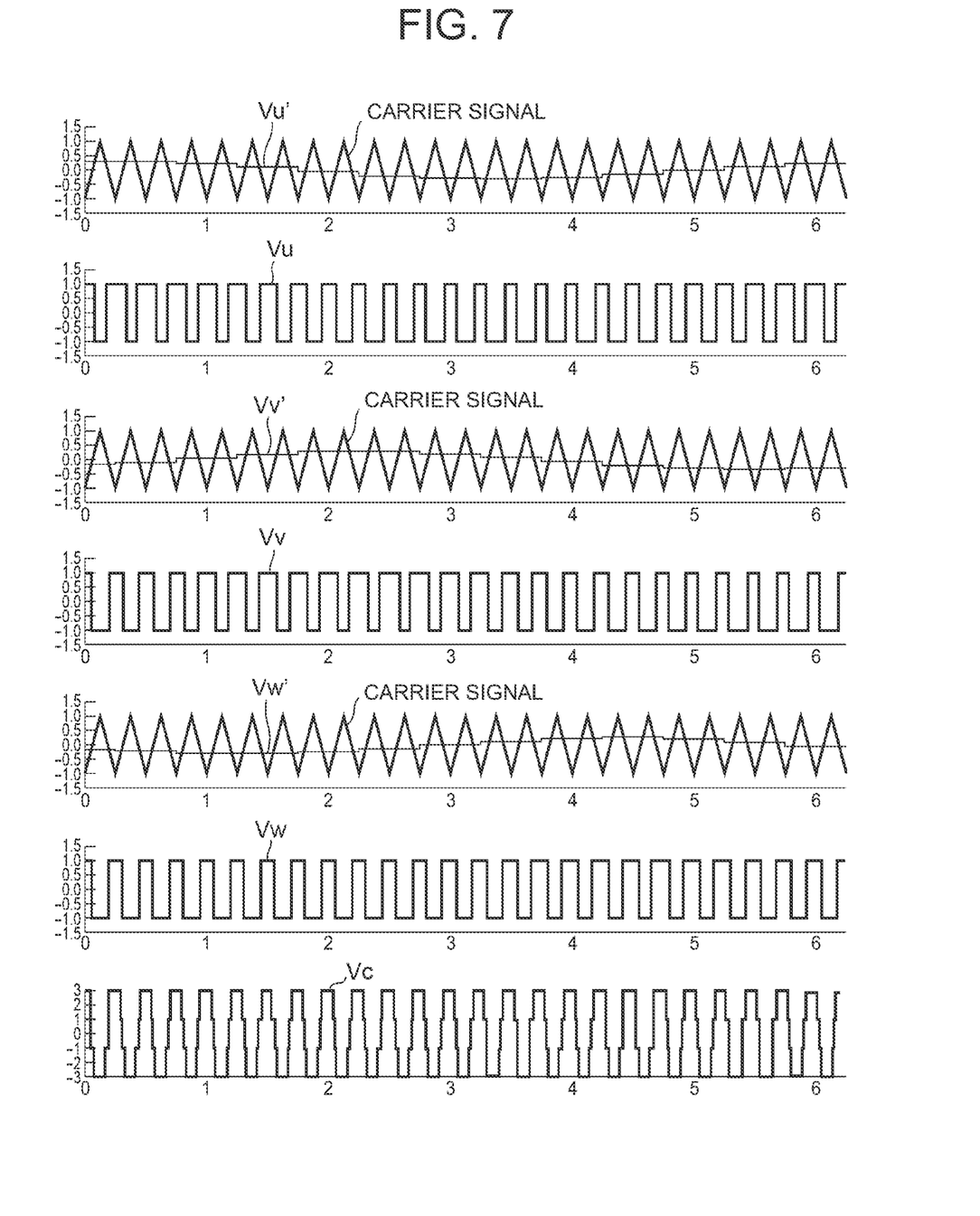
FIG. 7 is a diagram showing three-phase modulation voltage command values, carrier signals, PWM waveforms, and a neutral point potential of a motor output by a phase voltage command calculating unit of a conventional inverter device.

FIG. 7 is a diagram showing three-phase modulation voltage command values Vu', Vv', and Vw', carrier signals, each phase voltage (PWM signal) of a U-phase voltage Vu, a V-phase voltage Vv, and a W-phase voltage Vw, and a neutral point voltage Vc of a motor in a conventional inverter device. A phase voltage command calculating unit not shown calculates three-phase modulation voltage command values Vu' (U-phase voltage command value), Vv' (V-phase voltage command value), and Vw' (W-phase voltage command value) each applied to an armature coil of each phase of the motor, based on the electric angle, current command value and phase current of the motor. Incidentally, the three-phase modulation voltage command values Vu', Vv', and Vw' in FIG. 7 are values after normalization (corrected to −1 to 1) with a DC voltage Vdc.

Next, a PWM signal generating unit not shown compares in magnitude between the three-phase modulation voltage command values Vu', Vv', and Vw' and a carrier signal (carrier triangular wave) to thereby generate a PWM signal which becomes a drive command signal of an inverter circuit. This PWM signal becomes each phase voltage of the U-phase voltage Vu, the V-phase voltage Vv, and the W-phase voltage Vw after normalization.

The neutral point potential Vc of the motor is calculated by the average value of each phase voltage (Vu+Vv+Vw)/3, but conventionally, the neutral point potential Vc fluctuates as shown in the lowermost stage of FIG. 7, thereby causing a problem that common mode noise is generated.

This common mode noise is generated by a common mode current which leaks through a stray capacitance between a compressor housing and the ground, for example, in the case of a motor which constitutes an electric compressor. There have heretofore been taken measures such as installing a large noise filter, etc. but in addition to this, there have been proposed a measure to be taken thereagainst by selection of a voltage vector, and the timing of switching, a measure to suppress a fluctuation in the neutral point potential by using a special carrier signal, etc. (refer to, for example, Patent Documents 1 to 4).

CITATION LIST

Patent Documents

Patent Document 1: Japanese Patent Application Laid-Open No. Hei 10 (1998)-23760
Patent Document 2: Japanese Patent Application Laid-Open No. 2003-18853
Patent Document 3: Japanese Patent No. 4389446
Patent Document 4: Japanese Patent No. 5045137

SUMMARY OF THE INVENTION

Problems to be Solved by the Invention

However, in Patent Document 1, as to a switching operation in a three-phase two-level inverter, it becomes difficult to apply a smooth sine wave voltage because only two phases are driven, thereby leading to the generation of noise. Further, in Patent Document 2, it is necessary to perform a switching operation in consideration of the operation of a PWM rectifier circuit, and a usable operating range and products are limited. In addition, since it is not assumed in Patent Document 3 that a control device utilizes the function of a PWM signal generating unit, it is necessary to use an expensive control device, and it is difficult to apply it to mass-produced products. Moreover, in Patent Document 4, only a microcomputer having two carrier signals enables implementation. Furthermore, Patent Document 4 has a problem in that since switching is performed at the timing of clearing a carrier count, the timing of switching is shifted due to the influence of a dead time when the directions of the phase currents are the same, so that it is not possible to suppress the fluctuation of the neutral point potential.

The present invention has been made in view of the above-mentioned conventional circumstances, and an object thereof is to provide an inverter device capable of realizing effective elimination or suppression of common mode noise in consideration of the influence of a dead time by using the function of a PWM signal generating unit.

Means for Solving the Problems

An inverter device of the present invention includes an inverter circuit having an upper arm switching element and a lower arm switching element connected in series for each phase between an upper arm power supply line and a lower arm power supply line, and applying a voltage at a connection point of the upper and lower arm switching elements of each phase to a motor as a three-phase AC output, and a control device which controls switching of the upper and lower arm switching elements of each phase of the inverter circuit. The inverter device is characterized in that the control device has a phase voltage command calculating unit which calculates and outputs three-phase modulation voltage command values for generating voltages each applied to each phase of the motor, and a PWM signal generating unit which generates a PWM signal PWM-controlling the inverter circuit, based on the three-phase modulation voltage command values and a single carrier signal, and the PWM signal generating unit corrects the three-phase modulation voltage command values output by the phase voltage command calculating unit to thereby cancel a change in the phase voltage applied to the motor by a change in the other phase voltage.

The inverter device of the invention of claim 2 is characterized in that in the above invention, the PWM signal generating unit applies different corrections to the three-phase modulation voltage command values output by the phase voltage command calculating unit according to the direction of a current flowing through the motor to thereby cancel a change in the phase voltage applied to the motor by a change in the other phase voltage.

The inverter device of the invention of claim 3 is characterized in that in the above respective inventions, the PWM signal generating unit fixes an ON/OFF states of the upper and lower arm switching elements of a predetermined one phase of the inverter circuit, and starts a specified section of switching from a state in which the lower arm switching element of one of the other two phases is ON and the upper arm switching element of the other phase is ON.

The inverter device of the invention of claim 4 is characterized in that in the above invention, the PWM signal generating unit starts a specified section of switching from a state in which the lower arm switching element of any one phase is ON and the upper arm switching elements of the other two phases are ON, and fixes the upper arm switching element of one of the other two phases in an ON state.

The inverter device of the invention of claim 5 is characterized in that in the invention of claim 3, the PWM signal generating unit starts a specified section of switching from a state in which the lower arm switching elements of any two phases are ON, and the upper arm switching element of the other one phase is ON, and fixes the lower arm switching element of one of the other two phases in an ON state.

The inverter device of the invention of claim 6 is characterized in that in the inventions of claims 3 to 5, the PWM signal generating unit fixes the ON/OFF states of the upper and lower arm switching elements of the predetermined one phase within one carry cycle, switches the upper and lower arm switching elements of the other two phases, and changes the phase to fix the ON/OFF states of the upper and lower arm switching elements within a plurality of consecutive carrier cycles.

The inverter device of the invention of claim 7 is characterized in that in the above respective inventions, the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

The inverter device of the invention of claim 8 is characterized in that in the above invention, the consecutive carrier cycles are two cycles or three cycles.

Advantageous Effect of the Invention

According to the present invention, there is provided an inverter device including an inverter circuit having an upper arm switching element and a lower arm switching element connected in series for each phase between an upper arm power supply line and a lower arm power supply line, and applying a voltage at a connection point of the upper and lower arm switching elements of each phase to a motor as a three-phase AC output, and a control device which controls switching of the upper and lower arm switching elements of each phase of the inverter circuit. In the inverter device, the control device has a phase voltage command calculating unit which calculates and outputs three-phase modulation voltage command values for generating voltages each applied to each phase of the motor, and a PWM signal generating unit which generates a PWM signal PWM-controlling the inverter circuit, based on the three-phase modulation voltage command values and a single carrier signal. The PWM signal generating unit corrects the three-phase modulation voltage command values output by the phase voltage command calculating unit to thereby cancel a change in the phase voltage applied to the motor by a change in the other phase voltage. It is therefore possible to eliminate or significantly suppress a fluctuation of a neutral point potential of the motor by a switching timing of each switching element. Consequently, the occurrence of common mode noise can be effectively eliminated or suppressed.

Also, in the present invention, the PWM signal generating unit which generates the PWM signal corrects the three-phase modulation voltage command values to thereby cancel the change in the phased voltage by another phase voltage. Thus, since the phase voltage command calculating unit does not output such three-phase modulation voltage command value as to cancel the change in the phase voltage by another phase voltage, the calculation is simplified.

Here, the phase voltage at the dead time considered when switching the switching element changes according to the direction of a current flowing through the motor. Thus, as in the invention of claim 2, if the PWM signal generating unit applies different corrections to the three-phase modulation voltage command values output by the phase voltage command calculating unit according to the direction of a current flowing through the motor to thereby cancel a change in the phase voltage applied to the motor by a change in the other phase voltage, it is possible to eliminate or suppress the fluctuation of the neutral point potential without hindrance regardless of the direction of the current flowing through the motor in consideration of the influence of the dead time.

Further, as in the invention of claim 3, if the PWM signal generating unit fixes an ON/OFF states of the upper and lower arm switching elements of a predetermined one phase of the inverter circuit, and starts a specified section of switching from a state in which the lower arm switching element of one of the other two phases is ON and the upper arm switching element of the other phase is ON, a change in the phase voltage can be smoothly canceled by a change in another phase voltage.

In this case, actually, as in the invention of claim 4, the PWM signal generating unit may start a specified section of switching from a state in which the lower arm switching element of any one phase is ON and the upper arm switching elements of the other two phases are ON, and fix the upper arm switching element of one of the other two phases in an ON state.

Further, as in the invention of claim 5, the PWM signal generating unit may also start a specified section of switching from a state in which the lower arm switching elements of any two phases are ON, and the upper arm switching element of the other one phase is ON, and fix the lower arm switching element of one of the other two phases in an ON state.

Incidentally, in the above control, the PWM signal generating unit fixes the ON/OFF states of the upper and lower arm switching elements of the predetermined one phase and switches the upper and lower arm switching elements of the other two phases within one carry cycle. However, as in the invention of claim 6, the phase to fix the ON/OFF states of the upper and lower arm switching elements is changed within a plurality of consecutive carrier cycles, so that the upper and lower arms switching elements of all phases can be switched within the plural carrier cycles. Thus, although distortion is likely to occur, the line voltage can be made into an acceptable sine wave.

More specifically, as in the invention of claim 7, the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

Further, the consecutive carrier cycles are two cycles or three cycles as in the invention of claim 8.

MODE FOR CARRYING OUT THE INVENTION

Hereinafter, embodiments of the present invention will be described in detail with reference to the drawings. An inverter device 1 of the embodiment is mounted on a so-called inverter-integrated electric compressor which drives a compression mechanism with a motor 8. The electric compressor constitutes, for example, a refrigerant circuit of a vehicle air conditioning device.

(1) Configuration of Inverter Device 1

Figure 1:
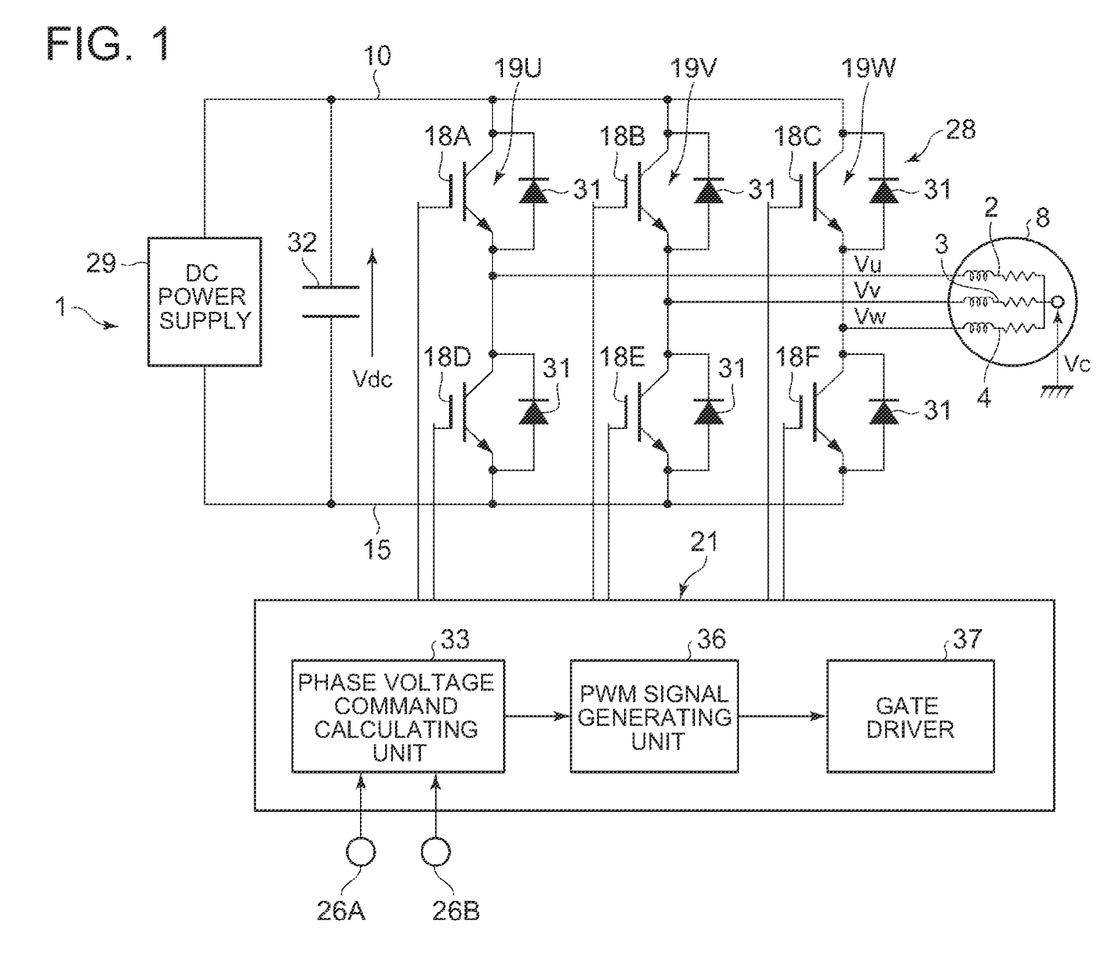
FIG. 1 is an electric circuit diagram of an inverter device according to one embodiment of the present invention.

In FIG. 1, the inverter device 1 includes a three-phase inverter circuit 28 and a control device 21. The inverter circuit 28 is a circuit which converts a DC voltage of a DC power supply (vehicle battery: for example, 300 V) 29 into a three-phase AC voltage and applies it to the motor 8. The inverter circuit 28 has a U-phase half bridge circuit 19U, a V-phase half bridge circuit 19V, and a W-phase half bridge circuit 19W. The phase half bridge circuits 19U to 19W respectively have upper arm switching elements 18A to 18C and lower arm switching elements 18D to 18F individually. Further, flywheel diodes 31 are respectively connected in antiparallel to the switching elements 18A to 18F.

Incidentally, in the embodiment, each of the switching elements 18A to 18F is constituted of an insulated gate bipolar transistor (IGBT) or the like in which a MOS structure is incorporated in a gate portion.

Then, the upper end side of the upper arm switching elements 18A to 18C of the inverter circuit 28 is connected to an upper arm power supply line (positive electrode side bus line) 10 of the DC power supply 29 and a smoothing capacitor 32. On the other hand, the lower end side of the lower arm switching elements 18D to 18F of the inverter circuit 28 is connected to a lower arm power supply line (negative electrode side bus line) 15 of the DC power supply 29 and the smoothing capacitor 32.

In this case, the upper arm switching element 18A and the lower arm switching element 18D of the U-phase half bridge circuit 19U are connected in series. The upper arm switching element 18B and the lower arm switching element 18E of the V-phase half bridge circuit 19V are connected in series. The upper arm switching element 18C and the lower arm switching element 18F of the W phase half bridge circuit 19W are connected in series.

Then, a connection point between the upper arm switching element 18A and the lower arm switching element 18D of the U-phase half bridge circuit 19U is connected to a U-phase armature coil 2 of the motor 8. A connection point between the upper arm switching element 18B and the lower arm switching element 18E of the V-phase half bridge circuit 19V is connected to a V-phase armature coil 3 of the motor 8. A connection point between the upper arm switching element 18C and the lower arm switching element 18F of the W-phase half bridge circuit 19W is connected to a W-phase armature coil 4 of the motor 8.

(2) Configuration of Control Device 21

The control device 21 is constituted of a microcomputer having a processor. In the embodiment, the control device 21 inputs a rotational number command value from a vehicle ECU, and inputs a phase current from the motor 8 to thereby control an ON/OFF state of each of the switching elements 18A to 18F of the inverter circuit 28, based on these. Specifically, the control device 21 controls a gate voltage applied to each of gate terminals of the switching elements 18A to 18F.

The control device 21 of the embodiment has a phase voltage command calculating unit 33, a PWM signal generating unit 36, a gate driver 37, and current sensors 26A and 26B each constituted of a current transformer for measuring a U-phase current iu, a V-phase current iv, and a W-phase current iw, which are motor currents (phase currents) of each phase flowing through the motor 8. Each of the current sensors 26A and 26B is connected to the phase voltage command calculating unit 33.

Incidentally, the current sensor 26A measures the U-phase current iu, and the current sensor 26B measures the V-phase current iv. Then, the W-phase current iw is obtained by calculation from these. Further, as to a method of detecting the motor current of each phase, there are a method of detecting a current value of the lower arm power supply line 15 and estimating the motor current of each phase from the current value and the operating state of the motor 8 by the phase voltage command calculating unit 33, etc. in addition to measuring with the current sensors 26A and 26B as in the embodiment. Therefore, the method of detecting and estimating each phase current is not particularly limited.

The phase voltage command calculating unit 33 calculates and generates by vector control based on a d-axis current and a q-axis current obtained from the electrical angle, the current command value and the phase current of the motor 8, three-phase modulation voltage command values Vu' (hereinafter, U-phase voltage command value Vu') Vv' (hereinafter, V-phase voltage command value XV), and Vw' (hereinafter, W-phase voltage command value Vw') for generating a U-phase voltage Vu, a V-phase voltage Vv, and a W-phase voltage Vw applied to the armature coils 2 to 4 of each phase of the motor 8.

The PWM signal generating unit 36 inputs the three-phase modulation voltage command values Vu', Vv', and Vw' calculated by the phase voltage command calculating unit 33, corrects these three-phase modulation voltage command values Vu', Vv', and Vw' as will be described later, and then compares in magnitude between these and the single carrier signal (carrier triangular wave) to thereby generate and output a PWM signal to be a drive command signal of each of the U-phase half bridge circuit 19U, the V-phase half bridge circuit 19V, and the W-phase half bridge circuit 19W of the inverter circuit 28.

The gate driver 37 generates based on the PWM signal output from the PWM signal generating unit 36, the gate voltage of the upper arm switching element 18A and the lower arm switching element 18D of the U-phase half bridge circuit 19U, the gate voltage of the upper arm switching element 18B and the lower arm switching element 18E of the V-phase half bridge circuit 19V, and the gate voltage of the upper arm switching element 18C and the lower arm switching element 18F of the W-phase half bridge circuit 19W.

Then, each of the switching elements 18A to 18F of the inverter circuit 28 is ON/OFF driven based on the gate voltage output from the gate driver 37. That is, when the gate voltage becomes an ON state (predetermined voltage value), the switching element is ON operated. When the gate voltage becomes an OFF state (zero), the switching element is OFF operated. When the switching elements 18A to 18F are the above-mentioned IGBTs, the gate driver 37 is a circuit for applying the gate voltage to the IGBT based on the PWM signal, and is constituted of a photocoupler, a logic IC, a transistor, and the like.

Then, the voltage at the connection point between the upper arm switching element 18A and the lower arm switching element 18D of the U-phase half bridge circuit 19J is applied (output) to the U-phase armature coil 2 of the motor 8 as the U-phase voltage Vu (phase voltage). The voltage at the connection point between the upper arm switching element 18B and the lower arm switching element 18E of the V-phase half-bridge circuit 19V is applied (output) to the V-phase armature coil 3 of the motor 8 as the V-phase voltage Vv (phase voltage). The voltage at the connection point between the upper arm switching element 18C and the lower arm switching element 18F of the W phase half bridge circuit 19W is applied (output) to the W phase armature coil 4 of the motor 8 as the W-phase voltage Vw (phase voltage).

(3) Operation of Control Device 21

Next, the actual control operation of the control device 21 will be described with reference to FIGS. 2 to 6. The PWM signal generating unit 36 constituting the control device 21 of the inverter device 1 of the present invention corrects the U-phase voltage command value Vu', the V-phase voltage command value Vv', and the W-phase voltage command value Vw' (three-phase modulation voltage command values) calculated and output by the phase voltage command calculating unit 33 as described above to thereby calculate a U-phase voltage command correction value Cu, a V-phase voltage command correction value Cv, and a W-phase voltage command correction value Cw (voltage command correction values) so that the fluctuation of a neutral point potential Vc of the motor 8 disappears (becomes zero).

Further, these U-phase voltage command correction value Cu, V-phase voltage command correction value Cv, and W-phase voltage command correction value Cw, and single carrier signals X1 to X4 to be described later are compared in magnitude, whereby a PWM signal which serves as a drive command signal for each of the U-phase half bridge circuit 19U, the V-phase half bridge circuit 19V, and the W-phase half bridge circuit 19W of the inverter circuit 28 is generated to operate the motor 8.

Incidentally, the U-phase voltage command correction value Cu, the V-phase voltage command correction value Cv, and the W-phase voltage command correction value Cw (voltage command correction values) shown in each figure are values after normalization of each voltage command correction value with a DC voltage Vdc (after correction to −1 to 1) in the case of performing three-phase modulation control of the motor 8. Further, each of the U-phase voltage Vu, the V-phase voltage Vv, and the W-phase voltage Vw is also a value after being normalized with the DC voltage Vdc.

(3-1) Operation of PWM signal Generating Unit 36 (Part 1)

Next, an example of the actual operation of the PWM signal generating unit 36 will be described in detail with reference to FIGS. 2 and 3. The uppermost stage of FIG. 2 indicates the U-phase voltage command correction value Cu and the carrier signal output by the PWM signal generating unit 36, the second stage from the top indicates the U-phase voltage Vu, the third stage from the top indicates the V-phase voltage command correction value Cv and the carrier signal output by the PWM signal generating unit 36, the fourth stage from the top indicates the V-phase voltage Vv, the third stage from the bottom indicates the W-phase voltage command correction value Cw and the carrier signal output by the PWM signal generating unit 36, the second stage from the bottom indicates the W-phase voltage Vw, and the bottom stage indicates the neutral point potential Vc of the motor 8, respectively.

Figure 2:
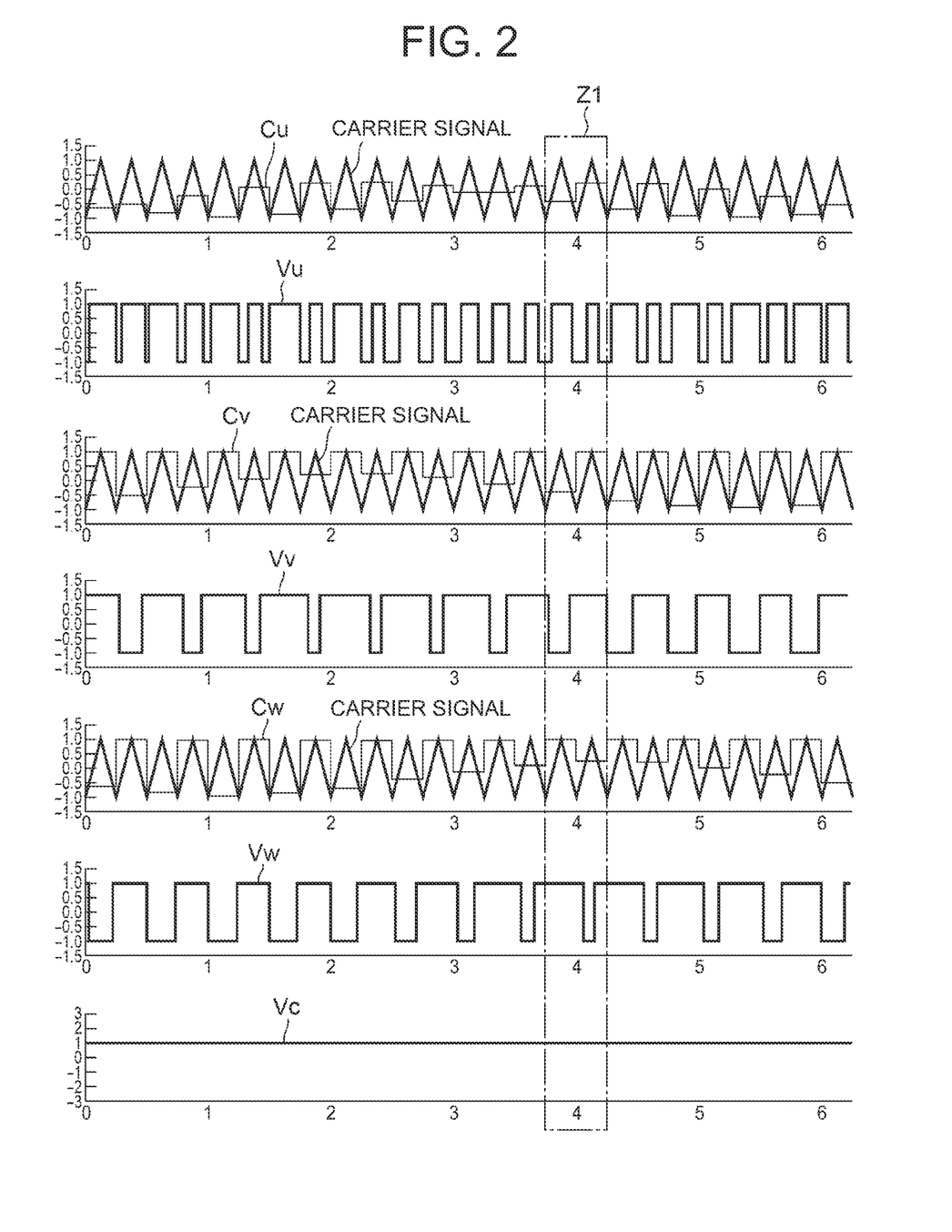
FIG. 2 is a diagram showing voltage command correction values, carrier signals, PWM waveforms, and a neutral point potential of a motor output by a PWM signal generating unit of a control device of FIG. 1.
Figure 3:
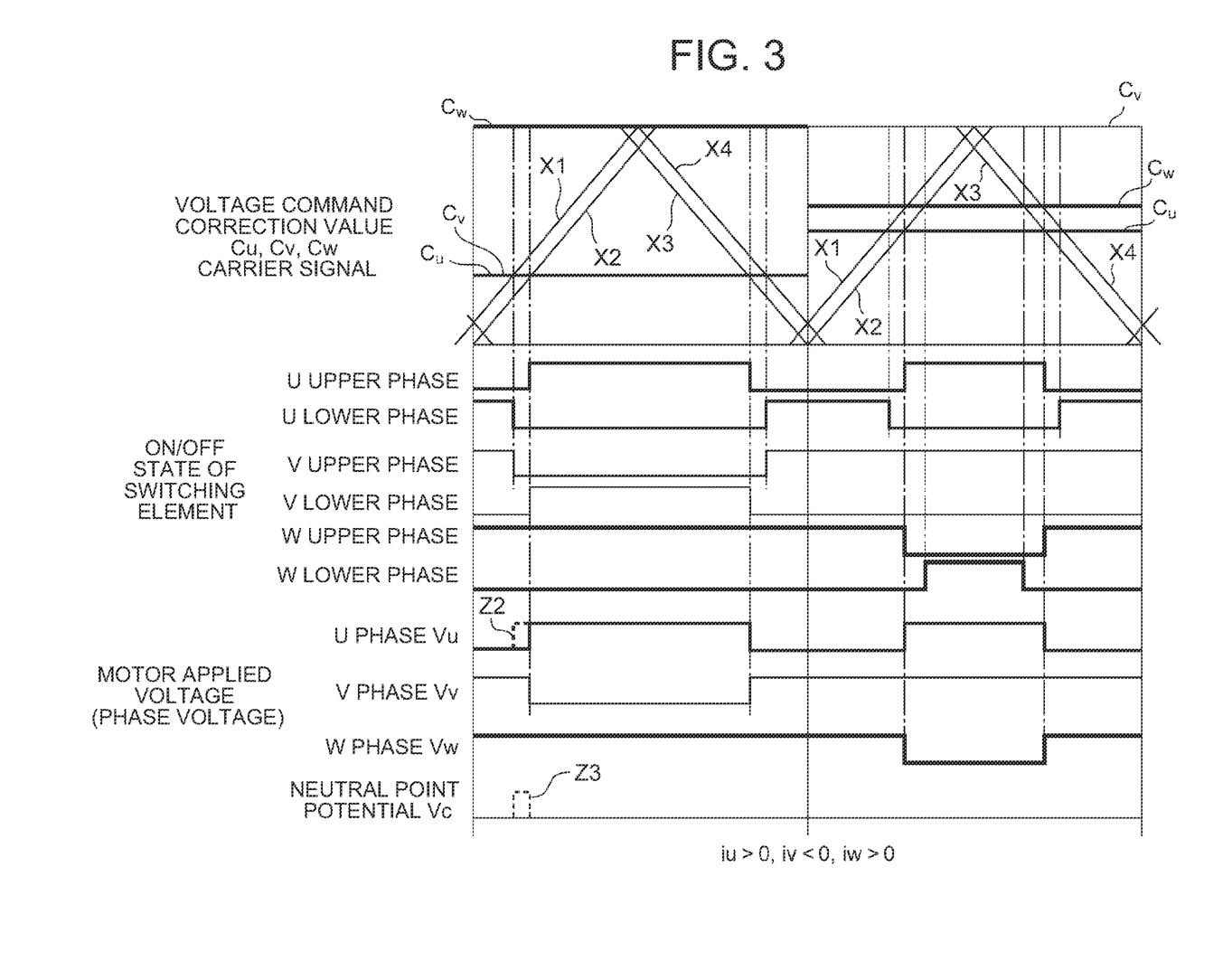
FIG. 3 is a diagram in which a frame Z1 part (two consecutive carrier cycles) of FIG. 2 is enlarged and an ON/OFF state of each switching element is added.

FIG. 3 is a diagram in which a frame Z1 part in FIG. 2 is enlarged, and the ON/OFF states of the switching elements 18A to 18F are added. The frame Z1 indicates two consecutive carrier cycles in FIG. 2. The uppermost stage of FIG. 3 indicates the U-phase voltage command correction value Cu, the V-phase voltage command correction value Cv, and the W-phase voltage command correction value Cw, and carrier signals (carrier triangular waves) X1 to X4 generated by the PWM signal generating unit 36 of the control device 21, the second stage from the top indicates the ON/OFF state of each of the switching elements 18A to 18F, the second stage from the bottom indicates the U-phase voltage Vu, the V-phase voltage Vv, and the W-phase voltage Vw applied to the motor 8, and the bottom stage indicates the neutral point potential Vc of the motor 8, respectively.

Further, the lower side of FIG. 3 shows the directions of the U-phase current iu, the V-phase current iv, and the W-phase current iw flowing through the motor 8. The direction of each phase current is indicated by >0 in the direction of inflow to the motor 8 and <0 in the direction of outflow from the motor 8. The example of FIG. 3 shows the direction in which the U-phase current iu and the W-phase current iw flow into the motor 8 and the direction in which the V-phase current iv flows out from the motor 8.

Incidentally, in the embodiment, the single carrier signal in the present invention is composed of two up X1 and X2 and two down X3 and X4 in order to create a dead time. The up X2 is a phase ahead of the up X1, and the down X4 is a phase ahead of the down X3. Then, in the first half of one carrier cycle, the PWM signal generating unit 36 compares the up X1 of the carrier signal and the respective voltage command correction values Cu, Cv, and Cw to generate a PWM signal to turn ON/OFF the U-phase lower arm switching element 18D, the V-phase upper arm switching element 18B, and the W-phase upper arm switching element 18C, and compares the up X2 of the carrier signal and the respective voltage command correction values Cu, Cv, and Cw to generate a PWM signal to turn ON/OFF the U-phase upper arm switching element 18A, the V-phase lower arm switching element 18E, and the W-phase lower arm switching element 18F.

In the latter half of one carrier cycle, the PWM signal generating unit 36 compares the down X3 of the carrier signal and the respective voltage command correction values Cu, Cv, and Cw to generate a PWM signal to turn ON/OFF the U-phase upper arm switching element 18A, the V-phase lower arm switching element 18E, and the W-phase lower arm switching element 18F, and compares the down X4 of the carrier signal and the respective voltage command correction values Cu, Cv, and Cw to generate a PWM signal to turning ON/OFF the U-phase lower arm switching element 18D, the V-phase upper arm switching element 18B, and the W-phase upper arm switching element 18C.

Further, in the embodiment, the PWM signal generating unit 36 starts the specified section of switching from the state in which the U-phase lower arm switching element 18D is ON, and the V-phase upper arm switching element 18B and the W-phase upper arm switching element 18C are ON.

When the U-phase current iu and the W-phase current iw take the direction of flowing into the motor 8, and the V-phase current iv takes the direction of flowing out from the motor 8 as in the embodiment, the U-phase voltage Vu changes due to the operation of the upper arm switching element 18A in the U phase, and the U-phase voltage Vu becomes "H" during a period in which the upper arm switching element 18A is ON. Even in the W phase, the W-phase voltage Vw changes due to the operation of the upper arm switching element 18C, and the W-phase voltage Vw becomes "H" during the period in which the upper arm switching element 18C is ON. On the other hand, in the V phase, the V-phase voltage Vv changes due to the operation of the lower arm switching element 18E, and the V-phase voltage Vv becomes "H" during a period in which the lower arm switching element 18E is OFF. Then, the sum of the widths of the periods of "H" in FIG. 3 becomes the magnitude of each phase voltage (U-phase voltage Vu, V-phase voltage Vv, W-phase voltage Vw).

As is clear from this figure, the PWM signal generating unit 36 corrects the voltage command values Vu', Vv', and Vw' within the first one carrier cycle (on the left side when facing FIG. 3) in the two consecutive carrier cycles of FIG. 3 to be set to the voltage command correction values Cu, Cv, and Cw such as shown on the left side when facing the figure, thereby fixing the W-phase upper arm switching element 18C in an ON state and the lower arm switching element 18F in an OFF state. Further, the PWM signal generating unit 36 synchronizes the timing at which the U-phase upper arm switching element 18A is turned ON/OFF and the timing at which the V-phase lower arm switching element 18E is turned ON/OFF and synchronizes the timing at which the U-phase lower arm switching element 18D is turned ON/OFF and the timing at which the V-phase upper arm switching element 18B is turned ON/OFF, thereby synchronizing the timing at which the U-phase voltage Vu becomes "H" and the V-phase voltage Vv becomes "L" and the timing at which the U-phase voltage Vu becomes "L" and the V-phase voltage Vv becomes "H", whereby a change in the U-phase voltage Vu is canceled by a change in the V-phase voltage Vv.

Further, the PWM signal generating unit 36 corrects the voltage command values Vu', Vv', and Vw' within the next one carrier cycle (on the right side when facing FIG. 3) in the two consecutive carrier cycles of FIG. 3 to be set to the voltage command correction values Cu, Cv, and Cw such as shown on the right side when facing the figure, thereby fixing the V-phase upper arm switching element 18B in an ON state and the lower arm switching element 18E in an OFF state. Further, the PWM signal generating unit 36 synchronizes the timing at which the U-phase upper arm switching element 18A is turned ON and the timing at which the W-phase upper arm switching element 18C is turned OFF and synchronizes the timing at which the U-phase upper arm switching element 18A is turned OFF and the timing at which the W-phase upper arm switching element 18C is turned OFF, thereby synchronizing the timing at which the U-phase voltage Vu becomes "H" and the W-phase voltage Vw becomes "L" and the timing at which the U-phase voltage Vu becomes "L" and the W-phase voltage Vw becomes "H", whereby a change in the U-phase voltage Vu is canceled by a change in the W-phase voltage Vw.

The correction operation of the PWM signal generating unit 36 as described above will be described in more detail as follows:

In a normal general inverter device, a PWM signal generating unit generates a PWM signal so as to realize three-phase modulation voltage command values of a phase voltage command calculating unit within one carrier cycle, but in the inverter device 1 of the present invention, the PWM signal generating unit 36 corrects the three-phase modulation voltage command values such that the change in the neutral point potential Vc of the motor 8 becomes zero within a plurality of consecutive carrier cycles, and a UV line voltage, a VW line voltage, and a WU line voltage do not change over the entire consecutive plural carrier cycles, to calculate voltage command correction values Cu, Cv, and Cw, thereby generating a PWM signal.

That is, assuming that the plurality of consecutive carrier cycles are two cycles as shown in FIG. 3, there exist two three-phase modulation voltage command values for the two cycles of the phase voltage command calculating unit 33. The PWM signal generating unit 36 reproduces a value obtained by adding the two three-phase modulation voltage command values in two carrier cycles. Alternatively, a value obtained by doubling a value received from the phase voltage command calculating unit 33 in the first carrier cycle may be reproduced in two carrier cycles.

Specifically, to explain with FIG. 3, the W-phase switching elements 18C and 18F take the voltage command correction values Cw at which they do not switch in the first carrier cycle and switch only in the second carrier cycle. Adding the values for these two times yields W-phase voltage command correction value Cw=W-phase voltage command value Vw'+common addition value α.

There is obtained a value that is added in common to all U, V, and W phases. It can be seen from FIG. 5 described later that in terms of each of the UV line voltage, the VW line voltage, and the WU line voltage, a waveform close to the voltage that is the same as the original three-phase modulation voltage command values can be applied.

In view of this common addition value α, the three-phase modulation voltage command values are output for each phase of the U phase, the V phase, and the W phase, but this command actually serves as the command value of the line voltage, and the UV line voltage, the VW line voltage, and the WU line voltage may be set as instructed.

Expressed mathematically, when it is assumed that the first U-phase voltage command value is Vu'1, and the second U-phase voltage command value is Vu'2, and that the voltage that can be applied to the motor 8 with the first U-phase PWM signal is PU1, and the voltage that can be applied to the motor 8 with the second U-phase PWM signal is PU2, the following is obtained:

$$PU1+PU2+\alpha=Vu'1+Vu'2 \qquad (i)$$

Similarly, considering the V phase and the W phase, the following are obtained:

$$PV1+PV2+\alpha=Vv'1+Vv'2 \qquad (ii)$$

$$PW1+PW2+\alpha=Vw'1+Vw'2 \qquad (iii)$$

Incidentally, Vv'1 is the first V-phase voltage command value, Vv'2 is the second V-phase voltage command value, PV1 is the voltage that can be applied to the motor 8 with the first V-phase PWM signal, and PV2 is the voltage that can be applied to the motor 8 with the second V-phase PWM signal. Further, Vw'1 is the first W-phase voltage command value, Vw'2 is the second W-phase voltage command value, PW1 is the voltage that can be applied to the motor 8 with the first W-phase PWM signal, and PW2 is the voltage that can be applied to the motor 8 with the second W-phase PWM signal.

Incidentally, as described above, considering the case where the value obtained by doubling the value received from the phase voltage command calculating unit 33 in the first carrier cycle is reproduced in two carrier cycles, the equation for each phase is represented as follows:

$$PU1+PU2+\alpha=2\times Vu'1 \qquad (iv)$$

$$PV1+PV2+\alpha=2\times Vv'1 \qquad (v)$$

$$PW1+PW2+\alpha=2\times Vw'1 \qquad (vi)$$

Incidentally, in the general conventional method, the above equations (iv) to (vi) are as follows (the common addition value α becomes 0 when line modulation such as two-phase modulation is not performed):

$$PU1+\alpha=Vu'1 \qquad (vii)$$

$$PV1+\alpha=Vv'1 \qquad (viii)$$

$$PW1+\alpha=Vw'1 \qquad (ix)$$

Further, even in the method of the Patent Document described above, the above equations for each phase can be expressed by the same equations as the above equations (vii) to (ix).

Considering the line voltage in the above equations (i) to (vi), the UV line voltage is given.

$$PU1+PU2+\alpha-(PV1+PV2+\alpha)=Vu'1+Vu'2-(Vv'1+Vv'2) \qquad (x)$$

Then, this equation (x) becomes the following equation (xi).

$$PU1-PV1+PU2-PV2=Vu'1-Vv'1+Vu'2-Vv'2 \qquad (xi)$$

Then, even in the conventional method by the above equations (vii) to (ix), the same value is obtained when two carrier cycles are taken into consideration. The two carrier cycles of the U and V phases are as follows:

$$PU1+\alpha+PU2+\alpha=Vu'1+Vu'2 \qquad (xii)$$

$$PV1+\alpha+PV2+\alpha=Vv'1+Vv'2 \qquad (xiii)$$

When these equations (xii) and (xiii) are added in the same manner as in the case of the equation (x), the same result is obtained as follows:

$$PU1+\alpha+PU2+\alpha-(PV1+\alpha+PV2+\alpha)=Vu'1+Vu'2-(Vv'1+Vv'2) \qquad (xiv)$$

Then, this equation (xiv) becomes the following equation (xv), which becomes the same as the equation (xi).

$$PU1-PV1+PU2-PV2=Vu'1-Vv'1+Vu'2-Vv'2 \qquad (xv)$$

As described above, when the two carrier cycles are also considered according to the present invention, it can be seen that the PWM signal generating unit 36 outputs the voltage (voltage command correction values Cu, Cv, and Cw) according to the output of the phase voltage command calculating unit 33.

As described above, since the neutral point potential Vc, which is the average of the respective phase voltages Vu, Vv, and Vw always becomes constant and does not change as shown in FIGS. 3 and 2, common mode noise can be effectively eliminated or suppressed. Further, in the embodiment, the PWM signal generating unit 36 fixes the W-phase upper arm switching element 18C to the ON state and the lower arm switching element 18F to the OFF state in the first carrier cycle of FIG. 3, and starts the specified section of switching from the state in which the U-phase lower arm switching element 18D is ON and the V-phase upper arm switching element 18B is ON. It is therefore possible to smoothly cancel the change in the U-phase voltage Vu by the change in the V-phase voltage Vv.

Further, in the next carrier cycle of FIG. 3, the PWM signal generating unit 36 fixes the V-phase upper arm switching element 18B to the ON state and the lower arm switching element 18E to the OFF state, and starts the specified section of switching from the state in which the U-phase lower arm switching element 18D is ON and the W-phase upper arm switching element 18C is ON. Even here, the change in the U-phase voltage Vu can be smoothly canceled by the change in the W-phase voltage Vw.

In addition, within the two consecutive carrier cycles as in the embodiment, the ON/OFF states of the W-phase upper and lower arm switching elements 18C and 18F are fixed in the first carrier cycle (on the left side when facing FIG. 3), and the ON/OFF states of the V-phase upper and lower arm switching elements 18B and 18E are fixed in the next carrier cycle (on the right side when facing FIG. 3). Thus, since the phase to fix the ON/OFF states of the upper and lower arm switching elements is changed within the two consecutive carrier cycles, the upper and lower arms switching elements of all phases are switched within the two carrier cycles of FIG. 3.

Figure 5:
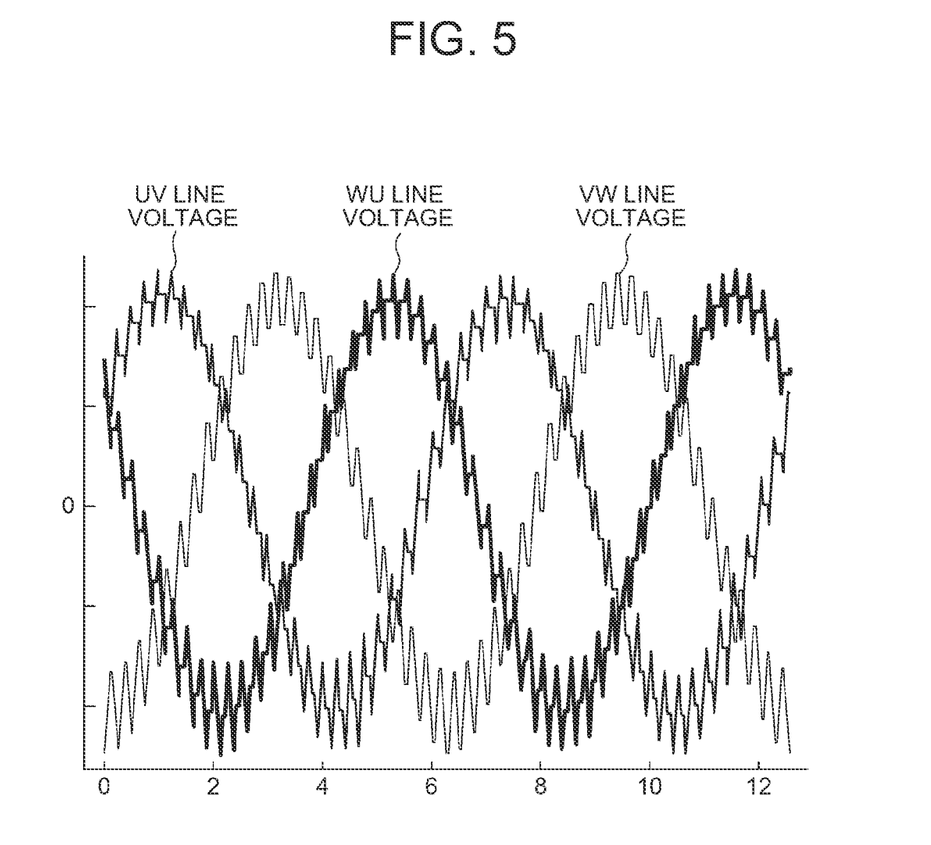
FIG. 5 is a diagram showing an integrated value of each line voltage in the case of FIGS. 3 and 4.
Figure 8:
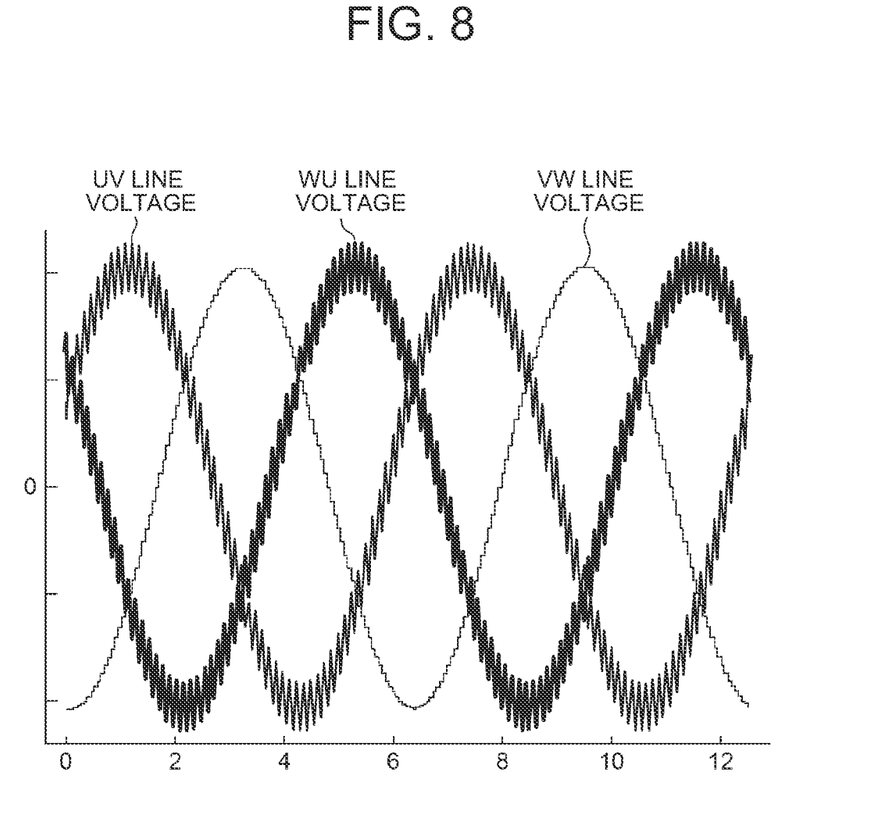
FIG. 8 is a diagram showing an integrated value of each line voltage in the case of FIG. 7.

Here, FIG. 5 shows the integrated values of the UV line voltage, the WU line voltage, and the VW line voltage where the PWM signal generating unit 36 corrects the voltage command values Vu', Vv', and Vw' to the voltage command correction values Cu, Cv, and Cw, respectively as in the above-described embodiment. FIG. 8 shows each of the cases where the PWM signals are generated with the voltage command values Vu', Vv', and Vw'. It can be seen that in the case of FIG. 5 as compared with FIG. 8, although distortion is likely to occur, the integrated value of each line voltage becomes an acceptable sine wave.

(3-2) Operation of PWM Signal Generating Unit 36 (Part 2)

Next, another correction operation of the PWM signal generating unit 36 will be described with reference to FIG. 4. Even in FIG. 4, the uppermost stage indicates the U-phase voltage command correction value Cu, the V-phase voltage command correction value Cv, and the W-phase voltage command correction value Cw, and the carrier signals X1 to X4. The second stage from the top indicates the ON/OFF state of each of the switching elements 18A to 18F, the second stage from the bottom indicates the U-phase voltage Vu, the V-phase voltage Vv, and the W-phase voltage Vw applied to the motor 8, and the bottom stage indicates the neutral point potential Vc of the motor 8, respectively.

Figure 4:
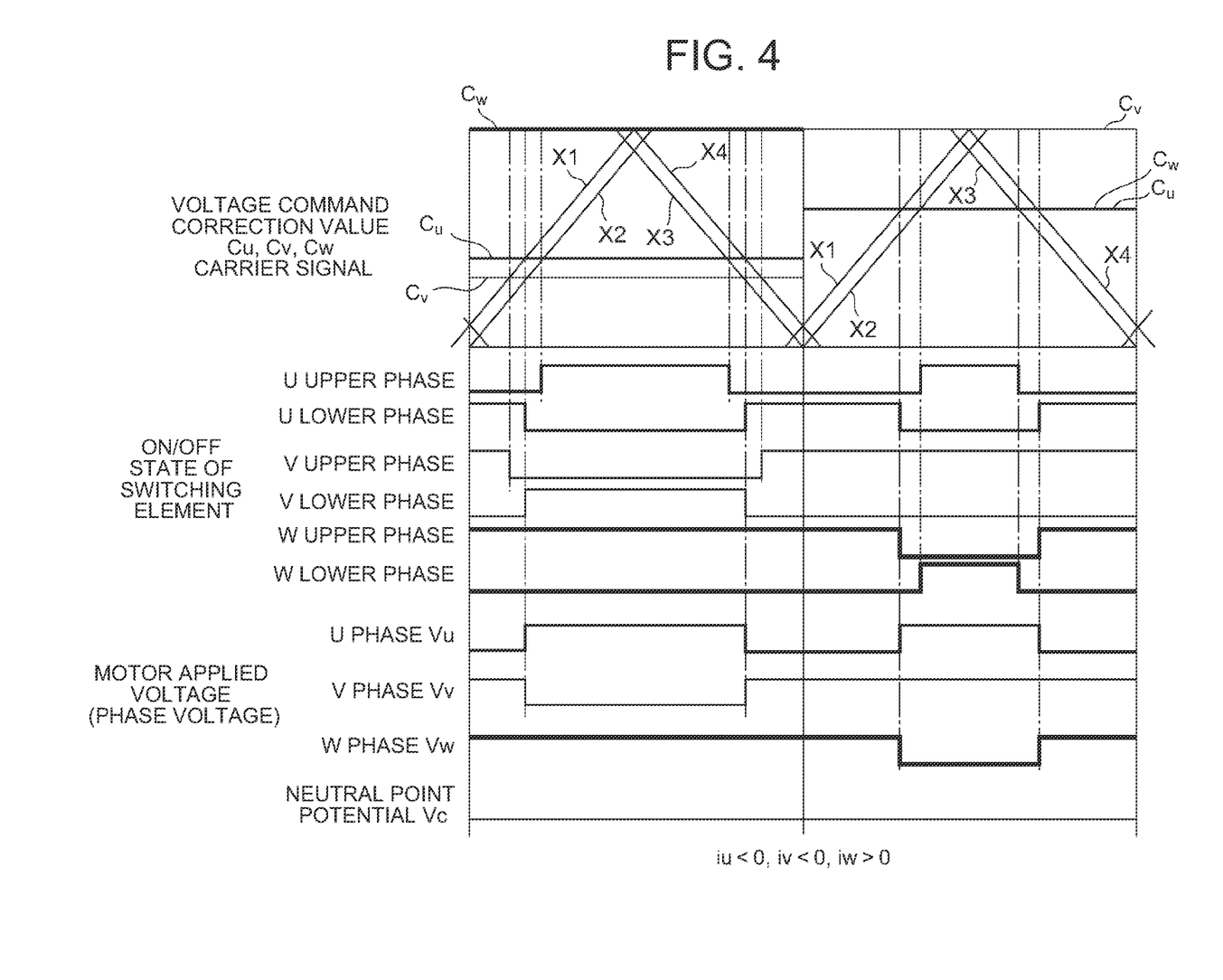
FIG. 4 is a diagram corresponding to FIG. 3 when the direction of a current flowing through the motor differs.

Also, similarly, the directions of the U-phase current iu, the V-phase current iv, and the W-phase current iw flowing through the motor 8 are shown on the lower side, but in the case of FIG. 4, there are shown the direction in which the U-phase current iu and the V-phase current iv flow out from the motor 8, and the direction in which the W-phase current iw flows into the motor 8.

Incidentally, the operation of the phase voltage command calculating unit 33 is the same as described above. Also, similarly, in the embodiment, the PWM signal generating unit 36 starts the specified section of switching from the state in which the U-phase lower arm switching element 18D is ON, and the V-phase upper arm switching element 18B and the W-phase upper arm switching element 18C are ON.

As described above, in the direction in which the phase current flows into the motor 8, the phase voltage applied to the motor 8 changes due to the operation of the upper arm switching element, and the phase voltage becomes "H" during the period in which the upper arm switching element is ON. In the direction in which the phase current flows out from the motor 8, the phase voltage changes due to the operation of the lower arm switching element, and the phase voltage becomes "H" during the period in which the lower arm switching element is OFF.

Therefore, in the case of the direction in which the U-phase current iu and the V-phase current iv flow out from the motor 8, and the direction in which the W-phase current iw flows into the motor 8, the voltage command correction values Cu, Cv, and Cw similar to those in FIG. 3 are generated, and switching is performed so that the switching timings of the U-phase upper arm switching element 18A and the V-phase lower arm switching element 18E are synchronized. Then, in the first carrier cycle of the two carrier cycles, for example, since the U-phase current iu takes the direction in which it flows out from the motor 8, the current flows through the flywheel diode 31 connected to the upper arm switching element 18A in the dead time before the U-phase lower arm switching element 18D is turned OFF and the upper arm switching element 18A is turned ON, so that as indicated by a broken line Z2 in FIG. 3, the U-phase voltage Vu becomes "H" at the timing earlier than that at which the V-phase voltage Vv becomes "L", and as indicated by a broken line Z3 in FIG. 3, the neutral point potential Vc fluctuates.

Therefore, in the case of such current directions as shown in FIG. 4, the PWM signal generating unit 36 applies a correction different from that in the case of FIG. 3 to the voltage command values Vu', Vv', and Vw' so that each of the switching elements 18A to 18F is switched at the timing such as shown in FIG. 4, to finely adjust the voltage command correction values Cu, Cv, and Cw. That is, in the case of FIG. 4, there are shown the direction in which the U-phase current iu and the V-phase current iv flow out from the motor 8 and the direction in which the W-phase current iw flows into the motor 8. Therefore, in the U-phase, the U-phase voltage Vu changes due to the operation of the lower arm switching element 18D, and the U-phase voltage Vu becomes "H" during the period in which the lower arm switching element 18D is OFF. Even in the V phase, the V-phase voltage Vv changes due to the operation of the lower arm switching element 18E, and the V-phase voltage Vv becomes "H1" during the period in which the lower arm switching element 18E is OFF. On the other hand, in the W phase, the W-phase voltage Vw changes due to the operation of the upper arm switching element 18C, and the W-phase voltage Vw becomes "H" during the period in which the upper arm switching element 18C is ON. Then, the sum of the widths of the periods of "H" in FIG. 4 becomes the magnitude of each phase voltage (U-phase voltage Vu, V-phase voltage Vv. W-phase voltage Vw).

That is, in the case of FIG. 4, the PWM signal generating unit 36 applies a correction different from that in FIG. 3 to the voltage command values Vu', Vv', and Vw' within the first one carrier cycle (on the left side when facing FIG. 4) in the two consecutive carrier cycles similar to FIG. 3 to set them as the voltage command correction values Cu, Cv, and Cw such as shown on the left side when facing FIG. 4. Consequently, the PWM signal generating unit 36 fixes the W-phase upper arm switching element 18C to the ON state and the lower arm switching element 18F to the OFF state, and further synchronizes the timing at which the U-phase lower arm switching element 18D is turn OFF and the timing at which the V-phase lower arm switching element 18E is turn ON and synchronizes the timing at which the U-phase lower arm switching element 18D is turned ON and the timing at which the V-phase lower arm switching element 18E is turned OFF, thereby synchronizing the timing at which the U-phase voltage Vu becomes "H" and the V-phase voltage Vv becomes "L", and the timing at which the U-phase voltage Vu becomes "L" and the V-phase voltage Vv becomes "H", whereby the change in the U-phase voltage Vu is canceled by the change in the V-phase voltage Vv.

Further, the PWM signal generating unit 36 applies a correction different from that in FIG. 3 to the voltage command values Vu', Vv', and Vw' within the next one carrier cycle (on the right side when facing FIG. 4) in the two consecutive carrier cycles of FIG. 4 to set them as the voltage command correction values Cu, Cv, and Cw such as shown on the right side when facing FIG. 4. Consequently, the PWM signal generating unit 36 fixes the V-phase upper arm switching element 18B to the ON state and the lower arm switching element 18E to the OFF state, and further synchronizes the timing at which the U-phase lower arm switching element 18D is turn OFF and the timing at which the W-phase upper arm switching element 18C is turn OFF and synchronizes the timing at which the U-phase lower arm switching element 18A is turned ON and the timing at which the W-phase upper arm switching element 18C is turned ON, thereby synchronizing the timing at which the U-phase voltage Vu becomes "H" and the W-phase voltage Vw becomes "L", and the timing at which the U-phase voltage Vu becomes "L" and the W-phase voltage Vw becomes "H", whereby the change in the U-phase voltage Vu is canceled by the change in the W-phase voltage Vw.

As described above, the neutral point potential Vc, which is the average of the respective phase voltages Vu, Vv, and Vw, always becomes constant and does not change even in the direction of the current (iu<0, iv<0, iw>0) in this case. That is, in consideration of the influence of the dead time, it is possible to eliminate or suppress the fluctuation of the neutral point potential Vc without hindrance regardless of the direction of the current flowing through the motor 8. It is therefore possible to effectively eliminate or suppress the common mode noise.

(3-3) Operation of PWM Signal Generating Unit 36 (Part 3)

Figure 6:
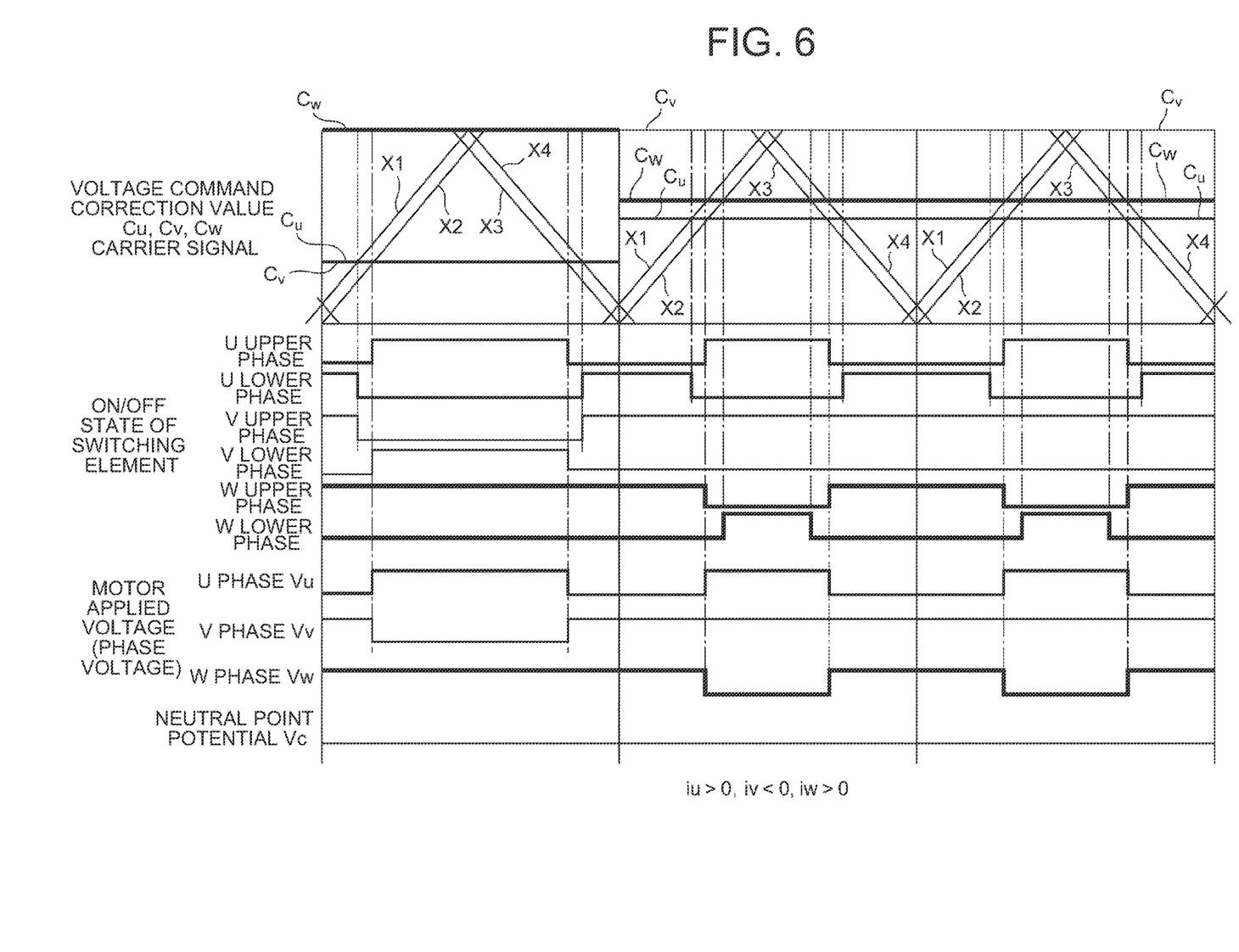
FIG. 6 is a diagram corresponding to FIG. 3 in the case of implementation in three consecutive carrier cycles.

Here, in the above examples (3-1) and (3-2), the phase to fix the ON/OFF state of each of the upper and lower arm switching elements 18A to 18F is changed within the two consecutive carrier cycles, but is not limited thereto. Its change may be executed within three consecutive carrier cycles as shown in FIG. 6.

In this case as well, the directions of the U-phase current iu, the V-phase current iv, and the W-phase current iw flowing through the motor 8 are the same as in the case of FIG. 3, and are the direction in which the U-phase current iu and the W-phase current iw flow into the motor 8, and the direction in which the V-phase current iv flows out from the motor 8. Further, the PWM signal generating unit 36 performs the same control as in the one carrier cycle on the left side when facing FIG. 3 in the one carrier cycle on the left side when facing FIG. 6, and performs the same control as in the one carrier cycle on the right side when facing FIG. 3 in the one carrier cycle on the right side when facing one carrier cycle in the center of FIG. 6, respectively.

As in this embodiment, the ON/OFF state of any one of the upper and lower arm switching elements is fixed within each one carrier cycle within the three consecutive carrier cycles, and the change in the phase voltage of one of the other two phases is canceled by the change in the other phase voltage, whereby the neutral point potential Vc may be kept constant. Further, even in this case, since the W phase is fixed in the first one carrier cycle in the three consecutive carrier cycles, and the V phase is fixed in each of the second and third carrier cycles, the upper and lower arm switching elements of all phases can be switched within the three carrier cycles in FIG. 6, and the line voltage can be made into an acceptable sine wave.

Incidentally, in each embodiment described above, the phase to fix the ON/OFF states of the upper and lower arm switching elements is changed within the two consecutive carrier cycles or the three consecutive carrier cycles, but if acceptable, it may be performed within more consecutive carrier cycles. However, as the number of carrier cycles is accumulated, two-phase modulation will eventually occur. Therefore, in practice, the two or three cycles are suitable as in the embodiment.

Also, in each embodiment, the specified section of switching is started from the state in which the U-phase lower arm switching element 18D is ON, and the V-phase upper arm switching element 18B and the W-phase upper arm switching element 18C are ON, but not limited thereto. Even if the specified section of switching is started from the state in which any two-phase lower arm switching element (for example, V-phase lower arm switching element 18E and W-phase lower arm switching element 18F) is ON, and the other one-phase upper arm switching element (for example, U-phase upper arm switching element 18A) is ON, a change in the phase voltage (for example, V-phase voltage Vv) of either one of the two phases can smoothly cancel a change in the phase voltage of the other phase (for example, U-phase voltage Vu).

Further, in the embodiment, the present invention is applied to the inverter device that drives and controls the motor of the electric compressor, but is not limited thereto. The present invention is effective for drive control of motors of various devices.

DESCRIPTION OF REFERENCE NUMERALS

1 inverter device
8 motor
10 upper arm power supply line
15 lower arm power supply line
18A to 18F upper and lower arm switching element
19U U-phase half bridge circuit
19V V-phase half bridge circuit
19W W-phase half bridge circuit
21 control device
26A, 26B current sensor
28 inverter circuit
33 phase voltage command calculating unit
36 PWM signal generating unit
37 gate driver.

The invention claimed is:

1. An inverter device comprising:
an inverter circuit having an upper arm switching element and a lower arm switching element connected in series for each phase between an upper arm power supply line and a lower arm power supply line, and applying a voltage at a connection point of the upper and lower arm switching elements of each phase to a motor as a three-phase AC output, and
a control device which controls switching of the upper and lower arm switching elements of each phase of the inverter circuit,
wherein the control device includes:
a phase voltage command calculating unit which calculates and outputs three-phase modulation voltage command values for generating voltages each applied to each phase of the motor, and
a PWM signal generating unit which generates a PWM signal PWM-controlling the inverter circuit, based on the three-phase modulation voltage command values and a single carrier signal, and
wherein the PWM signal generating unit corrects the three-phase modulation voltage command values output by the phase voltage command calculating unit to cancel a change in the phase voltage applied to the motor by a change in the other phase voltage.

2. The inverter device according to claim 1, wherein the PWM signal generating unit applies different corrections to the three-phase modulation voltage command values output by the phase voltage command calculating unit according to the direction of a current flowing through the motor to cancel a change in the phase voltage applied to the motor by a change in the other phase voltage.

3. The inverter device according to claim 1, wherein the PWM signal generating unit fixes an ON/OFF states of the upper and lower arm switching elements of a predetermined one phase of the inverter circuit, and
starts a specified section of switching from a state in which the lower arm switching element of one of the other two phases is ON and the upper arm switching element of the other phase is ON.

4. The inverter device according to claim 3, wherein the PWM signal generating unit starts a specified section of switching from a state in which the lower arm switching element of any one phase is ON and the upper arm switching elements of the other two phases are ON, and
fixes the upper arm switching element of one of the other two phases in an ON state.

5. The inverter device according to claim 3, wherein the PWM signal generating unit starts a specified section of switching from a state in which the lower arm switching elements of any two phases are ON, and the upper arm switching element of the other one phase is ON, and
fixes the lower arm switching element of one of the other two phases in an ON state.

6. The inverter device according to claim 3, wherein the PWM signal generating unit fixes the ON/OFF states of the upper and lower arm switching elements of the predetermined one phase within one carry cycle, and switches the upper and lower arm switching elements of the other two phases, and wherein the PWM signal generating unit changes the phase to fix the ON/OFF states of the upper and lower arm switching elements within a plurality of consecutive carrier cycles.

7. The inverter device according to claim 1, wherein the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

8. The inverter device according to claim 7, wherein the consecutive carrier cycles are two cycles or three cycles.

9. The inverter device according to claim 2, wherein the PWM signal generating unit fixes an ON/OFF states of the upper and lower arm switching elements of a predetermined one phase of the inverter circuit, and starts a specified section of switching from a state in which the lower arm switching element of one of the other two phases is ON and the upper arm switching element of the other phase is ON.

10. The inverter device according to claim 4, wherein the PWM signal generating unit fixes the ON/OFF states of the upper and lower arm switching elements of the predetermined one phase within one carry cycle, and switches the upper and lower arm switching elements of the other two phases, and wherein the PWM signal generating unit changes the phase to fix the ON/OFF states of the upper and lower arm switching elements within a plurality of consecutive carrier cycles.

11. The inverter device according to claim 5, wherein the PWM signal generating unit fixes the ON/OFF states of the upper and lower arm switching elements of the predetermined one phase within one carry cycle, and switches the upper and lower arm switching elements of the other two phases, and wherein the PWM signal generating unit changes the phase to fix the ON/OFF states of the upper and lower arm switching elements within a plurality of consecutive carrier cycles.

12. The inverter device according to claim 2, wherein the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

13. The inverter device according to claim 3, wherein the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

14. The inverter device according to claim 4, wherein the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

15. The inverter device according to claim 5, wherein the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

16. The inverter device according to claim 6, wherein the PWM signal generating unit corrects the three-phase modulation voltage command values so that a fluctuation of a neutral point potential of the motor becomes zero within a plurality of consecutive carrier cycles, and a line voltage does not change over the entire plurality of consecutive carrier cycles.

\* \* \* \* \*